(12) United States Patent
Oelsch

(10) Patent No.: US 6,441,519 B1
(45) Date of Patent: Aug. 27, 2002

(54) SPINDLE MOTOR FOR HARD DISKS WITH CUP-SHAPED SLEEVE

(75) Inventor: Jürgen Oelsch, Hohenroth (DE)

(73) Assignee: Precision Motors Deutsche Minebea GmbH, Villingen-Schwenningen (DE)

( * ) Notice: Subject to any disclaimer, the term of this patent is extended or adjusted under 35 U.S.C. 154(b) by 0 days.

(21) Appl. No.: 09/463,913

(22) PCT Filed: Jul. 31, 1998

(86) PCT No.: PCT/EP98/04806

§ 371 (c)(1),
(2), (4) Date: Feb. 1, 2000

(87) PCT Pub. No.: WO99/07057

PCT Pub. Date: Feb. 11, 1999

(30) Foreign Application Priority Data

Aug. 2, 1997 (DE) .......................... 197 33 565

(51) Int. Cl.$^7$ ............................... H02K 7/00
(52) U.S. Cl. .................. 310/67 R; 320/90; 320/217
(58) Field of Search ................. 310/67 R, 216, 310/217, 218, 258, 90, 89

(56) References Cited

U.S. PATENT DOCUMENTS

| 4,245,870 A | * | 1/1981 | Punshon et al. ............... 308/36 |
| 4,612,468 A | * | 9/1986 | Sturm et al. ............... 310/67 R |
| 4,634,908 A | * | 1/1987 | Sturm ......................... 310/64 |
| 4,682,065 A | * | 7/1987 | English et al. ................. 310/90 |
| 5,698,914 A | * | 12/1997 | Shiga et al. ............... 310/60 A |

* cited by examiner

Primary Examiner—Nestor Ramirez
Assistant Examiner—Thanh Lam
(74) Attorney, Agent, or Firm—John M. Harrington; Kilpatrick Stockton LLP

(57) ABSTRACT

This invention relates to a driving device, especially for hard disk drives, consisting of a stator, a rotor, an axis as well as corresponding bearings. The winding packet constituting the drive is arranged, together with the corresponding laminated core, on a holding sleeve, which projects axially on both sides over the laminated core. Possible production methods relating to this invention are also described.

8 Claims, 1 Drawing Sheet

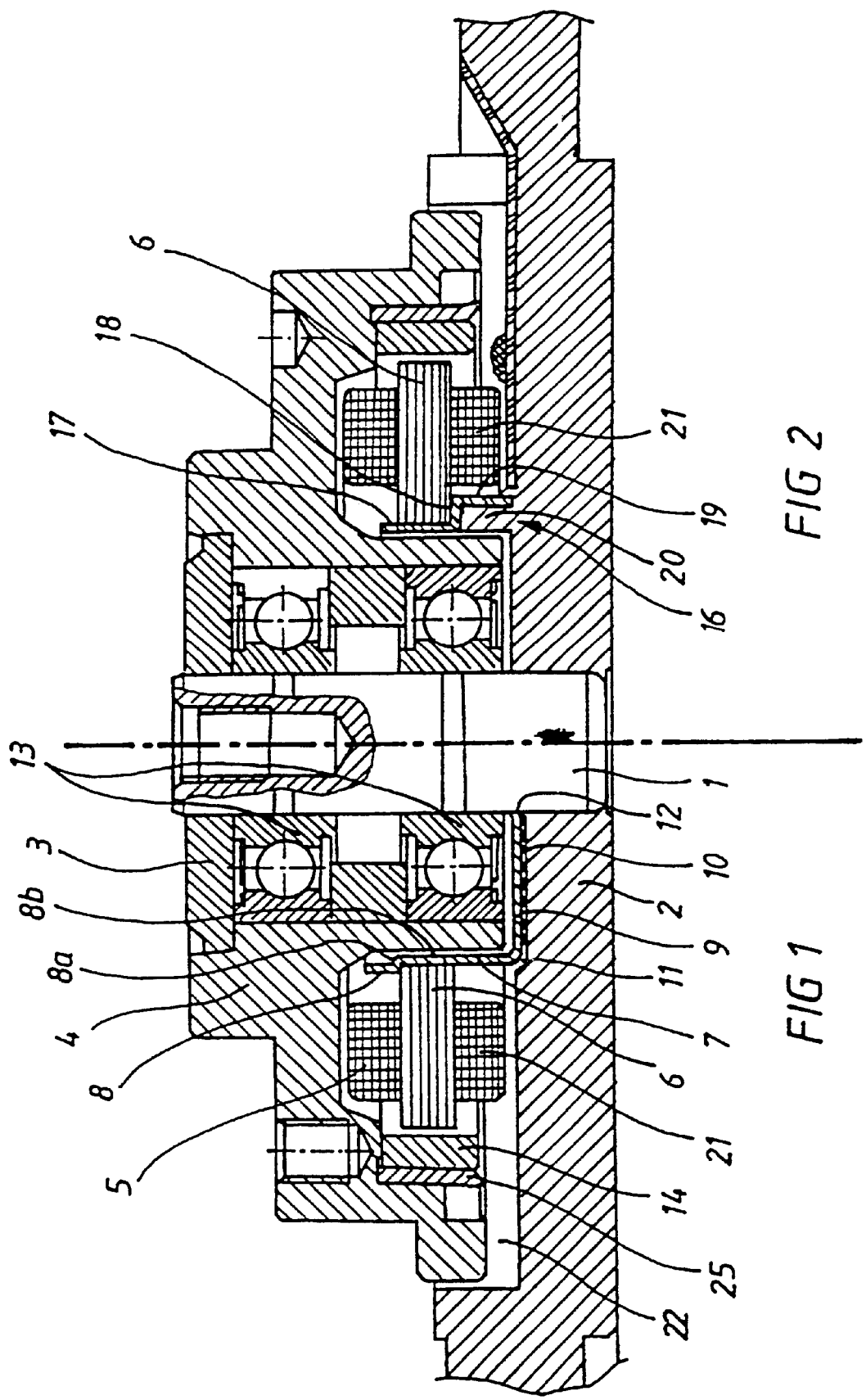

SPINDLE MOTOR FOR HARD DISKS WITH CUP-SHAPED SLEEVE

FIELD OF THE INVENTION

The present invention is directed to a drive device, especially for hard disk drives, as well as the corresponding production methods.

BACKGROUND OF THE INVENTION

According to the present state of technology, the spindle motor has a rotor in the form of an external rotor motor; the stator is positioned by means of a projection that gradually protrudes from the casing, equally radial to the swiveling axis and axial to the height. This projection, which has an axial step, is an integrated component of the casing (flange, baseplate).

The document U.S. Pat. No. 5,343,104 makes a fan motor known that has an external rotor motor, which has a rotating axis. On this motor a flange is arranged between the armature and rotor. The flange serves, on the one hand, as a receptacle for individual parts, and on the other hand, serves as a mechanical divider between the windings of the winding packet and represents the rotating axis and the receptacle flange in the motor's cover.

The document WO 90 13167 in comparison concerns a stabilized spindle motor for hard disk drive with a fixed axis, which has two support rings to stabilize the armature (rotor) and to pre-emphasize the oscillation frequency in a high frequency area and, therefore, result in a connected reduction of its oscillation amplitude. Both of these support rings are arranged in radial inner and outer areas under the armature (rotor). The inner support ring is designed so that in the assembled state it is located inside the central opening of the armature (rotor) and results in its radial positioning. The axial positioning of the armature (rotor) follows by means of the outer support ring. There are also two support rings for the winding packet, which, in addition to positioning the armature (rotor), pre-emphasize the armature's (rotor's) oscillation.

The disadvantage of this known solution is that the constantly narrowing room with the simultaneous higher space factor of the winding packet increases the danger of jammed windings between the winding packet and the stator's projection. Since deficiently installed winding packets cannot be detected by simple visual checks or can only be discovered conditionally by electrical evaluation, there is, at the same time, an increased risk that the faulty product will be delivered and its defects will be detected only during its actual use. Simultaneously, the portion of rejections increases, which is business-wise and economically not sound.

Another disadvantage is that the winding, that points radially inward on the air gap between the rotor and stator, bridges over the air gap and comes into contact with the rotor's surface, thereby, damaging it.

There are already winding packets that are plastic-extrusion coated or placed on a plastic holder. These solutions remove the above-described disadvantages, but are in many cases not possible to use because of restricted space.

The task, therefore, is to improve the winding packet's holder at the stator of a driving device for a hard disk storage (the type as described at the beginning), so that in all cases of restricted space, as described, the disadvantages of this state of technology can be prevented.

SUMMARY OF THE INVENTION

A fundamental characteristic of the invention is the invention-related drive device that has a holding sleeve with axial, sleeve-shaped projection, as well as horizontal radial-formed projections, which are arranged so that the winding packet in the transition is centered between an axial and a horizontal radial projection and that the holding sleeve projects axially on both sides over the laminated core.

The function of the integrated step-by-step projection is taken over by a separate cup- or pipe-shaped holder, which projects axially over the laminated core and is positioned radially and axially by means of a step-shaped designed projection in the casing.

The laminated core is then fastened securely to the pipe- or cup-shaped additional component by compression, adhesion or other means of fastening and then is first spooled.

This measure prevents the winding from becoming stripped and jammed during the stator's assembly in the casing. At the same time, the cylindrical restriction surfaces of the pipe- or cup-shaped holders that project out both sides over the winding packet, protect (it) from contact between the rotating hub of the rotor and loose windings of the stator.

It is hereby preferred that the holding sleeve projects at least one-sided over the winding packet. This offers a further advantage that an unintentional damaging of the winding packet can be prevented during the fastening at a corresponding component of the driving device. According to the designed embodiment, both sides can also project out.

The holding sleeve can be equipped with an offset bend. This bend can either serve as a stop for the laminated core or can secure and adjust the positioning in relation to the stator and/or the rotor. Of course, it is possible to install two such bends.

The holding sleeve is centered opposite the stator and/or the rotor, and, if necessary, the axis. This can either take place by the already described bend, which is placed on a projection in the stator and/or rotor. Of course, the sleeve can also be equipped with a projection, an extension or flange that is supported directly on the axis. In this last described embodiment, it is possible then that the stator, the rotor and the holding sleeve, together with the laminated core and winding packets, all center opposite the axis together. Thus, the assembly precision is increased.

Of course, it is also possible to center the holding sleeve alone opposite the stator or rotor.

The holding sleeve, can, for example, have a self-sticking adhesive coating for fastening.

To further increase the precision, the bearings used can be pre-stressed against each other clearance-free.

The production methods provide first that the holding sleeve is equipped with a laminated core and is installed so that the holding sleeve protrudes on both sides. Only afterwards does a winding of the laminated core take place. Then the holding sleeve, together with the laminated core and winding packet, are inserted.

Although, in the accompanying figures, the fastening and centering of the holding sleeves, laminated core and winding packets on the stator are represented, a fastening and centering of these elements on the rotor's axis is, of course, also possible.

Altogether, an essential improvement emerges that indicates the rejection quotas are decreased and the assembly precision is increased.

The holding sleeve also serves as a radial, inwardly directed protection cap against the (rotating) air gap and prevents the windings of the winding packet from bridging over the air gap and damaging the rotating surfaces of the rotor.

Furthermore, this protection cap prevents undesirable vibrations from the winding packet.

The invention-related objectives of the submitted present invention result not only from the matter of the particulars in the patent claims, but also the various combinations of the individual patent claims.

All records, documents and evidence, inclusive of the abstract, open and disclosed statements and declarations and indications and features, especially those represented embodiments in the drawings, will be claimed as fundamental and significant to the invention as far as the claims individually or in combinations are relative to the position that the technology is new.

The invention at hand will be explained more precisely by the various embodiments shown by the representational drawings. Hereby, additional significant features and advantages of the invention will be concluded from the drawings and their descriptions.

BRIEF DESCRIPTION OF THE DRAWINGS

FIG. 1: A half section through a layout of a spindle motor in a first embodiment;

FIG. 2: A half section through a second embodiment of the same spindle motor.

The spindle motor, according to FIGS. 1 and 2, consists of a central axis (1) on which the bearings (13) are flanged in reciprocal distance from one another.

The bearings (13) carry the rotor (4), which is profiled as somewhat bell-shaped and carries an upper sealing ring (3), which seals the bearings (13) outside.

DETAILED DESCRIPTION

The stator supports a winding packet (5), which consists of a laminated core (6) and the winding (21) placed on it.

It is now important that the winding packet (5) is centered with the laminated core (6) on the holding sleeve (7). For this purpose this forms an upper axial projection (8), which becomes a short, horizontal and bent projection (8a), which changes on its side again into an axial projection (8b). In this way the radial inner-lying front of the laminated core (6) is placed centrally in the transition between the projection (8) and (8a) and fastened there. The fastening results from either adhesion or compression or by adhesion without compression or by both fastening procedures.

The axial projection (8b) goes, however, with a 90° angle into a horizontal flange (9) that is centered with a front (12) on the axis (1).

This centering on the axis is not absolutely necessary, but can take place on a flange-sided projection (20).

The fastening of the holding sleeve (7) on the stator takes place when the underside of the flange (9) has an adhesive coating (10); which, for example, can be a double adhesive tape made of an applied adhesive coating or made from another fastening means. A better, more secure, holding can be attained when this adhesive coating (10) is applied in a deepened groove (11) in the stator (2).

This way space is saved because the inside edge of the flange (9) is then somewhat flush with the inside edge (22) of the stator (2).

The special production steps in reference to the invention are also important because the entire winding packet (5) with the laminated core (6) and the winding (21) is produced together with the holding sleeve (7). Then this complete system is first placed in the motor that is represented by FIGS. 1 and 2.

Besides, the motor consists in a known manner of a permanent magnetic ring (14) that is surrounded on its radial outer-lying perimeter by a back close ring (15).

The back close ring (15) is pressed into the rotor (4), where it adheres.

FIG. 2 shows another embodiment of the invention, where it is recognizable that the horizontal flange (9) in accordance with FIG. 1 can also be left out, and instead, two axial flanges, which are placed co-axially to one another or concentrically, can be used. There, two represented holding sleeves (16) consist of an upper, axial flange (17), which is separated by a short horizontal shoulder (18) from the lower axial flange (19), resulting in the fastening of the holding sleeve (16) on the stator (2), which, again, has in the horizontal shoulder's (18) area, an adhesive surface on which the holding sleeve (16) is fastened on the projection (20) of the stator (2).

Similarly, the adhesion may also take place only in the area of the vertical flange (19) on the projection (20) of the stator (2), and, likewise, the adhesion may occur on the shoulder (18) or also on the shoulder (19) with the stator (2).

In FIG. 1 it can also be provided that the horizontal flange (9) is left out and that instead, the vertical part of the holding sleeve (7) is directly anchored with its lower front in a corresponding ring groove of the stator.

What is claimed is:

1. A driving device suitable for use in hard disk drives, the driving device comprising:

a stator comprising a deepened groove, wherein the deepened groove is aligned perpendicular to a fixed axis of the stator;

a rotor positioned pivotable on the fixed axis of the stator on corresponding bearings;

a winding packet comprising a laminated core and a corresponding winding fastened on the stator, the laminated core having a radially inwardly directed front side separated from the rotor by an air gap between the rotor and the stator, the radially inwardly directed front side of the laminated core being directed towards a surface of the rotor; and a holding sleeve disposed partially within the elongate groove of the stator which is formed as a separate component from the stator and which is positioned in the air gap, the holding sleeve concave radially outward from the fixed axis of the stator along the fixed axis of the stator, wherein the holding sleeve has an axial projection and a horizontal radially formed projection positioned so that the winding packet is centered in a transition between the axial projection and the horizontal radially formed projection, the holding sleeve projects beyond the laminated core, and wherein a radial inner surface of the stator core is fitted to a radial outer surface of the holding sleeve.

2. The driving device, according to claim 1, wherein the axial projection of the holding sleeve projects axially beyond at least one side of the winding packet.

3. The driving device, according to claim 1, wherein the holding sleeve is centered opposite at least one of the stator and the axis and, respectively, the rotor.

4. The driving device, according to claim 3, wherein the holding sleeve is centered over a radial flange on the axis and, respectively, the rotor.

5. The driving device, according to claim 1, wherein the holding sleeve comprises an adhesive coating for the purpose of attachment on the deepened groove of the stator.

6. The driving device, according to claim 1, wherein the corresponding bearings are pre-stressed, free from play, against each other.

7. The driving device, according to claim 1, wherein a radial inner surface of a radial inner opening centered in a bottom portion of the holding sleeve is fitted to a radial outer surface of the fixed axis of the stator.

8. The driving device, according to claim 1, wherein the stator core is fitted to a radial outer surface of a top portion of the holding sleeve, and an inner surface of a bottom portion of the holding sleeve is fitted to a radial outer surface of a projection of the stator.

* * * * *